United States Patent [19]

Siepmann

[11] 3,769,673
[45] Nov. 6, 1973

[54] GATE VALVE

[75] Inventor: Walter Siepmann, Belecke/Mohne, Germany

[73] Assignee: Siepmann-Werke KG, Belecke/Mohne, Germany

[22] Filed: Nov. 19, 1971

[21] Appl. No.: 200,459

Related U.S. Application Data

[63] Continuation-in-part of Ser. No. 43,095, June 3, 1970.

[30] Foreign Application Priority Data
Nov. 24, 1970 Germany.................. P 20 57 746.2

[52] U.S. Cl.............................. 29/157.1 R, 72/358
[51] Int. Cl.............................................. B21k 1/24
[58] Field of Search................. 29/157.1 R; 72/358, 72/377; 251/329

[56] References Cited
UNITED STATES PATENTS
1,828,478  10/1931  Sparks........................... 29/157.1 R
2,065,035  12/1936  Taylor............................ 29/157.1 R

*Primary Examiner*—Richard J. Herbst
*Attorney*—Richard K. Stevens et al.

[57] ABSTRACT

Gate valves having a valve closure member slidably mounted, for closure by movement perpendicular to the fluid passage direction, in a housing center part having a pot-shaped upper portion and an approximately rectangular lower portion having flat walls including recesses for cylindrical fluid flow connections, and guide ledge lugs on the inside transverse walls of the housing center portion, on which ledge-shaped guide lugs on the plates of the closure member are slidably mounted for positive guidance of the closure member right to its closed position. The rectangular lower portions of the housing center part, including the flat walls, transverse walls, and guide ledge lugs are formed by hot backwards extrusion of a drop-forged preformed body.

3 Claims, 7 Drawing Figures

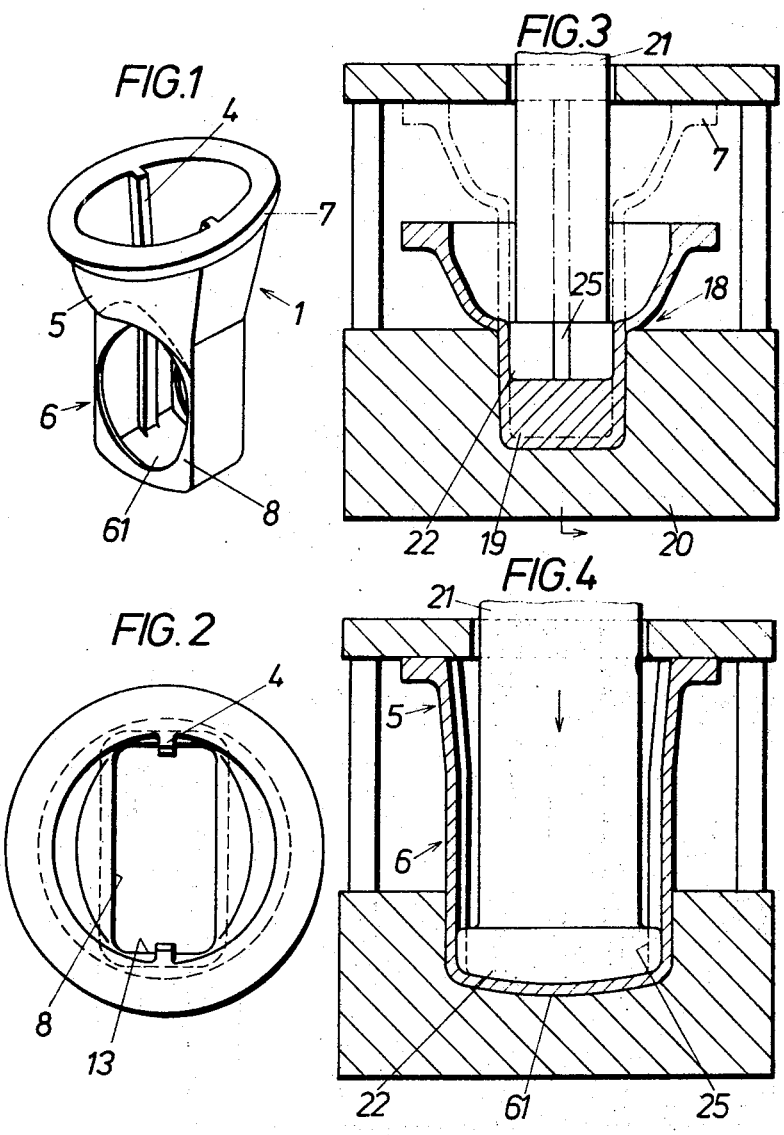

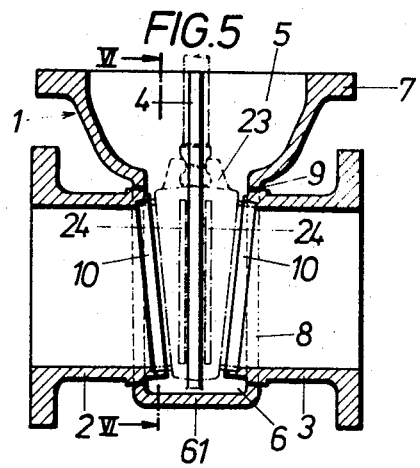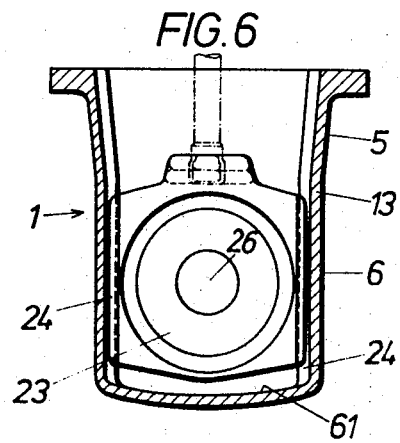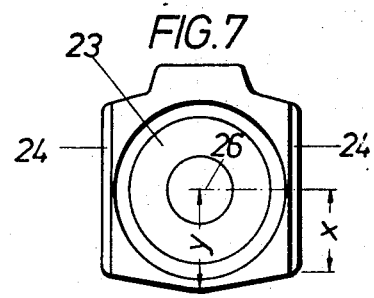

GATE VALVE

This application is a continuation-in-part of my co-pending application Ser. No. 43,095, filed June 3, 1970.

The present invention relates to a gate valve having the axis of the valve stem directed perpendicularly to the longitudinal axis of coaxial passage connections and having seat rings inserted inclined to said longitudinal axis for a wedge-shaped gate closure member which comprises plates and is positively guided in nonrotatable manner on ledges of a housing center part directed in the same direction as the axis of the stem, by means of pairs of ledge-like guide lugs provided on diametrically opposite peripheral sections of the plates, and forming a groove between them, said housing center part comprising a single piece in a pot shape and having, with respect to its cross-section, a widened, drop-forged upper part provided with a lid-fastening flange and an approximately rectangular lower part with flat walls. In the flat walls there are provided connecting recesses for cylindrical flow connections, and the ends of the flow connections and the flat walls are connected with each other by circular welds.

Gate valves of this type are generally valves of large construction in which the diameter of the cross-section of flow is as a rule more than 50 mm and often substantially larger.

In accordance with the proposal in my previous U.S. Pat. application, Ser. No. 43,095, filed June 3, 1970, which forms the basis for the following invention, the housing center part which is made by hot plastic forming from a length of billet, is formed with a widened upper part, preferably of the nature of a body of revolution which is brought into its final shape by drop-forging and is provided with the lid-fastening flange, and with a lower part having transverse walls which is extruded by the hot backwards extrusion process through a rectangular, annular nozzle between a mandrel and a thin bottom die, and has parallel thin socket connecting walls and parallel thicker transverse walls, particularly provided with guide ledges.

In one previously known construction of the prior art, the pot-shaped housing center part, which is provided with flat walls, was forged in its entire height in a closed die. The flat walls are inclined to the center plane of the housing, which is directed to the same direction as the axis of the stem, at least at an acute angle corresponding to the taper of the die, and are provided on the peripheral side of the connecting recesses for the flow-through socket connections with bead-like collars which are connected with the ends of the attached flow-through socket connections by an annular outer weld on the end side. These known valve housings already have guide ledges, forged by means of a mandrel in the die, for pairs of guide lugs of the wedge-shaped closure member. In accordance with forging principles, the ledges provided in the housing were forged by means of a mandrel which had pressure surfaces extending more or less obliquely. The grooves provided in the mandrel for the shaping of the guide ledges also require a sufficient magnitude of indication, starting from the highest point of the mandrel body. The recess in the forging mandrel necessary to receive the material in the region of the ledges to be formed had to be of funnel shape. These forging requirements led to the result that the ledges intended for the positive guiding of the closure member broadened conically at the lowest point of the center part of the valve housing and finally even assumed a tulip shape. In order to be able to use such ledges while avoiding expensive special mechanical treatments, the grooves provided between the pairs of guide lugs of the closure member were developed with a large amount of clearance and located as high up as possible in the direction towards the lid flange, i.e., at a large distance from the bottom of the center part of the housing. Thus, because of manufacturing considerations, the guiding of this closure member cannot operate as precisely as desirable in the last phase of the closing process or the first phase of the opening process, i.e., at times when the stresses produced by the fluid which flows therethrough are particularly great.

The object of the present invention is to solve the problem of the precise guiding of the valve closure member by a special development of the center part of the housing and of the valve closure member in a manner which excludes expensive treatment by cutting tools and devices, either entirely or to a substantial extent, and permits manufacture of the guide means in an economically favorable manner within the forging and extrusion process. The invention is based in this connection on the discovery that a valve housing which has the features of the aforementioned application forms an essential basis for the solution of the said problem.

The gate valve in accordance with the invention is accordingly characterized by the combination of the following features:

a. The center part of the housing has, below the upper part which has been widened by the drop-forging, a lower part shaped in a rectangle by the hot backwards extrusion process, which lower part, preferably extending from the lid fastening flange, has guide ledges which are produced simultaneously with the transverse walls of said lower part during the hot backwards extrusion process, and in this connection are calibrated in V-shape down to the bottom of the housing.

b. The pairs of ledge-shaped guide lugs provided on the plates of the closure member are slidably guided along the guide ledges of the transverse walls of the housing with a small clearance which remains the same over the entire length and extend (when in the closed position) at least down over the vertical region of the lower diameter halves of the plates to close to the bottom of the housing.

First of all, the advantages with respect to manufacture of the proposal of the previous application are retained. The upper widened, stabilizing region of the housing center part which is brought into final shape by forging, satisfies the requirements which permit a dependable centered fastening of the lid. The lower part, which is integrally connected with the drop-forged upper part, does not have any die taper. The transversely directed flat walls and the longitudinally directed shorter side walls extend in each case in the direction of the axis of the stem, parallel to each other, and are precisely perpendicular to the longitudinal axis of the flow-through sockets. Corresponding to the material used, one can produce in this way, while retaining a die for the upper part and an extruder for the lower part, center parts, having a housing flange and bottom, for valve housings of different height.

In accordance with the discovery which forms the basis of the invention, the aforementioned features of the previous application form an essential prerequisite for another improvement which relates to the development of the positive guide means between the center part of the housing and the closure member. It has been found that one can now, immediately upon the manufacture of the rectangularly shaped lower housing part, by using a rectangular ram with precisely calibrated longitudinal grooves in a hot backwards extrusion process, provide the housing transverse wall with positive guide ledges which, at least over the height of the rectangular lower part of the housing, have a constant, calibrated cross-section and in this connection extend to the bottom of the housing. There is thus produced a guide ledge on each transverse wall which, in the most important lowermost longitudinal section, exhibits maximum precision with unchanged cross-section. In combination with this V-calibrated, deeply drawn housing ledge created in this manner, there is now the possibility of using wedge-shaped closure members comprising plates, in which connection the pairs of ledge-shaped guide lugs surrounding the housing ledge are also deeply drawn in such a manner that the longitudinal section of all ledge-shaped guide lug pairs lying below the center axis of the closure member can be precisely as long as the radius of the closure member. In practice, the corresponding longitudinal section is slightly smaller than the radius of the closure member, for instance in order to avoid the depositing of dust which collects in corners. These housing ledges which are free of die tapers, and the deeply drawn-down pairs of guide lugs which surround the housing ledges almost without clearance, to allow the closure member to be guided quite precisely in the range of movement in the deepest lying position, i.e., nearest the closing position (this is the position with the valve slightly open). This contributes to the protection of and reduction of wear of, the guide elements of the closure member and housing to a considerable extent, particularly in larger valves, where the fluid which flows therethrough exposes the closure members to considerable nonuniform transverse stresses partially producing vibrations, particularly in the final phase of a closing process or in the initial phase of the opening process. The precise guidance provided by the invention also contributes to quiet operation of the valves.

The drawing illustrates the gate valve in accordance with the invention and in part the method of manufacturing the central part of the housing.

FIG. 1 shows in perspective the central part of the housing of the valve.

FIG. 2 is a plan view of FIG. 1.

FIGS. 3 and 4 show, in two vertical longitudinal sections 90° apart from each other, the manner of manufacture of the central part of the housing.

FIG. 5 shows the gate valve in vertical longitudinal section.

FIG. 6 is a cross-section along the line VI—VI of FIG. 5.

FIG. 7 shows the closure member in a side view.

In the gate valve, the valve housing has a housing central part 1 and two coaxial flow connections 2 and 3. In the central part of the housing, vertically directed guide ledges 4 are provided. The central part of the housing is developed in one piece in pot shape and consists of a widened upper part 5 and an approximately rectangular lower part 6. The upper part 5 is widened approximately in the manner of a body of revolution and provided on the upper edge with the flange 7 which serves to fasten a top part bearing a stem, which part is not shown. The housing lower part 6 has transversely directed flat walls 8 in which connecting recesses 9 for the cylindrical flow connections 2 and 3 are provided. In the inner ends of the connections, cylindrical seating rings 10 are inserted or screwed into corresponding recesses of the shape of annular grooves. The seating rings are arranged obliquely corresponding to the inclination of a wedge-shaped gate closure member 23 composed of plates.

The housing center part 1 consists of an upper part 5 which is drop-forged in its final shape and of a lower part 6 manufactured by the hot backwards extrusion process in which the transversely directed flat walls 8 are directed parallel to each other and to the axis of the stem. The longitudinally directed shorter transverse walls 13 are also directed parallel to each other and to the axis of the stem, but are somewhat thicker and provided with the guide ledges 4 on which the gate closure member 23 is positively guided by a groove between enclosing ledge-like guide lugs 24 provided in each case in pairs.

During the course of the manufacture of the center part of the housing, a length of billets of predetermined size is first of all, after heating, pressed with a hammer or pressed in known manner into a cake which is then further deformed between a bottom die and a top die provided with a protruding butt to form the pot-shaped drop-forged body 18, at forging heat, which forms the starting material, shown in FIG. 3, for the following operation. This drop-forging 18 already forms the upper part of the housing to be produced, which is provided with the flange 7. The drop-forging has a thick, approximately rectangular, bottom extension 19. This bottom extension 19 forms a centering aid for the precise insertion of the drop forging into the tool 20 corresponding to a bottom die. Before insertion into the bottom die 20, the drop-forging was subjected to a short additional heating. Associated with the die 20 is the mandrel 21, of substantially rectangular cross-section, which has a head 22 which is thickened slightly on all sides. This head 22 has on the narrow sides vertically directed grooves 25 which are of constant cross-section over their entire length (aside from mitered or rounded entrance edges).

The mandrel is moved down under a press, not shown in the drawing. The rectangular space remaining between the head of the mandrel and the die recess, in which space the cross-section of the grooves 25 are included, forms an annular nozzle through which, upon the depression of the mandrel 21, the material displaced from the extension 19 rises, and in this connection forms the flat walls 8 directed parallel to each other and the transverse walls 13. During this hot extrusion there are also produced the guide ledges 4. These ledges are imparted their final shape in the annular nozzle, namely in the rectangularly profiled grooves of the head 22 of the mandrel 21, and V-shaped ledges extending down to the housing bottom 61 are produced. The ledges, therefore, have immediately a uniform form, free of die tapers at least over the height of the rectangular bottom part of the housing produced in the hot backwards extrusion process. In contradistinction to previously known forged gates, the guide ledges produced in this manner have the greatest precision in the lower region down to the lowest point.

In order to improve the guidance of the plates of the gate closure member 23, they are provided in a barrel shaped, as seen in plan view, i.e., convexly curved on top and on bottom, the ledge-like guide lugs 24 (FIG. 7) being formed by the transversely directed flat end sections. These ledge-like guide lugs have a relatively large height which can extend practically over the entire diameter of the closure member. The particularly long dimensioning of the length section x lying below the plate center 26 is essential. This section x can be as large as the radius y, but in practice is made slightly smaller. The groove formed between the guide lugs 24, which are in each case arranged in pairs, is so closely adapted in its dimensions to the cross-section of the guide strips 4 in the housing, that the closure member 23 is constantly guided with substantially minimum play, and thus particularly accurately guided between the lowest position up to above the central opening position. This exact guidance is thus assured even when the gate is only slightly open, i.e., at a time when the most unfavorable stresses are exercised on or transmitted to the closure member and its guide elements by the fluid which flows therethrough.

The material for the gate housing made from drop-forgings, and the closure member is typically forging steel or a steel alloy.

What is claimed is:

1. A method of producing a center part of a sliding gate valve housing having a cross-section of flow greater than 50 mm. in diameter, comprising, providing a drop-forged body having an upper portion shaped as a body of revolution with an annular flange at the upper end of said body of revolution, and a thick, approximately rectangular, bottom extension, integral with said upper portion, placing said rectangular bottom extension into a shallow lower die which receives said bottom extension, providing a pressure operated ram of substantially rectangular cross-section, the head of said ram having two flat sides and two transverse sides, which transverse sides have grooves therein parallel to the axis of said ram and of a cross-section corresponding to the desired cross-section of the desired ledge-shaped guide lugs on the transverse walls of the resultant center part, and pressing said ram into the bottom extension of the drop-forged body which is in the lower die, thereby forming an approximately rectangularly shaped bottom extension of said center part of a slide valve housing, said extension having parallel flat walls and parallel transverse walls having ledge-shaped guide lugs thereon extending to the bottom of said transverse walls, by the free rearward flow of the material of said body through the clearance between the die and the ram in opposition to the pressure of the ram.

2. The method of claim 1, additionally comprising a final operating step wherein the annular flange of the upper part of the body is struck against a horizontal guiding surface, the rearward flow of the material in the lower extension of the body thereby being at least in part controlled and the upper portion being directed into a desired position.

3. The method of claim 1, wherein said ram is provided with a ram head which extends radially from the axis of the stem of said ram to form a head having a cross-sectional area approximately equal to the internal cross-sectional area of the rectangular lower extension of the center part of the slide valve housing, said ram head having the grooves therein for forming the ledge-shaped guide lugs.

* * * * *